(12) United States Patent
Shurtleff

(10) Patent No.: US 6,805,062 B2
(45) Date of Patent: Oct. 19, 2004

(54) APPARATUS AND METHOD FOR RECLAIMING USEFUL OIL PRODUCTS FROM WASTE OIL INCLUDING HYDROGEN INJECTION

(76) Inventor: Edward Carlton Shurtleff, 420 Main Street East, Suite 494, Milton, ON (CA), L9T 5G3

( * ) Notice: Subject to any disclaimer, the term of this patent is extended or adjusted under 35 U.S.C. 154(b) by 0 days.

(21) Appl. No.: 10/337,482

(22) Filed: Jan. 6, 2003

(65) Prior Publication Data

US 2004/0011704 A1 Jan. 22, 2004

Related U.S. Application Data

(63) Continuation of application No. 08/956,480, filed on Oct. 23, 1997, now abandoned, which is a continuation-in-part of application No. 08/829,526, filed on Mar. 28, 1997, now Pat. No. 5,795,462, which is a continuation of application No. 08/199,201, filed on Jan. 21, 1994, now abandoned, which is a continuation-in-part of application No. 07/712,775, filed on Jun. 10, 1991, now Pat. No. 5,286,349, which is a continuation-in-part of application No. 07/246,834, filed on Sep. 20, 1988, now abandoned.

(51) Int. Cl.⁷ ............................................. C10M 175/00
(52) U.S. Cl. ....................... 108/179; 208/185; 208/186; 208/191
(58) Field of Search .................................. 208/179, 185, 208/186, 142

(56) References Cited

U.S. PATENT DOCUMENTS

| | | | |
|---|---|---|---|
| 4,882,037 A | * 11/1989 | Kalnes et al. | ................. 208/85 |
| 4,894,140 A | 1/1990 | Schon | |
| 5,045,179 A | 9/1991 | Langhoff et al. | |
| 5,302,282 A | * 4/1994 | Kalnes et al. | ............... 208/179 |

* cited by examiner

*Primary Examiner*—Thuan D. Dang
(74) *Attorney, Agent, or Firm*—Lahive & Cockfield, LLP

(57) ABSTRACT

An apparatus and method for reclaiming a useful oil product, from waste oil provides an evaporation chamber in which waste oil is heated and vaporized, preferably at a temperature which causes some cracking of the oil. Hydrogen is injected into the vaporized oil, so to cause saturation of at least some of the olefins in the vaporized oil. The vaporized oil is then condensed and recovered as a useful oil product. The apparatus operates at substantially atmospheric pressure, or a pressure only slightly above atmospheric pressure. Hydrogenation of the vaporized oil stabilizes the recovered oil, and prevents formation of tars and other heavier hydrocarbons, which can cause difficulties in use of the recovered oil.

21 Claims, 6 Drawing Sheets

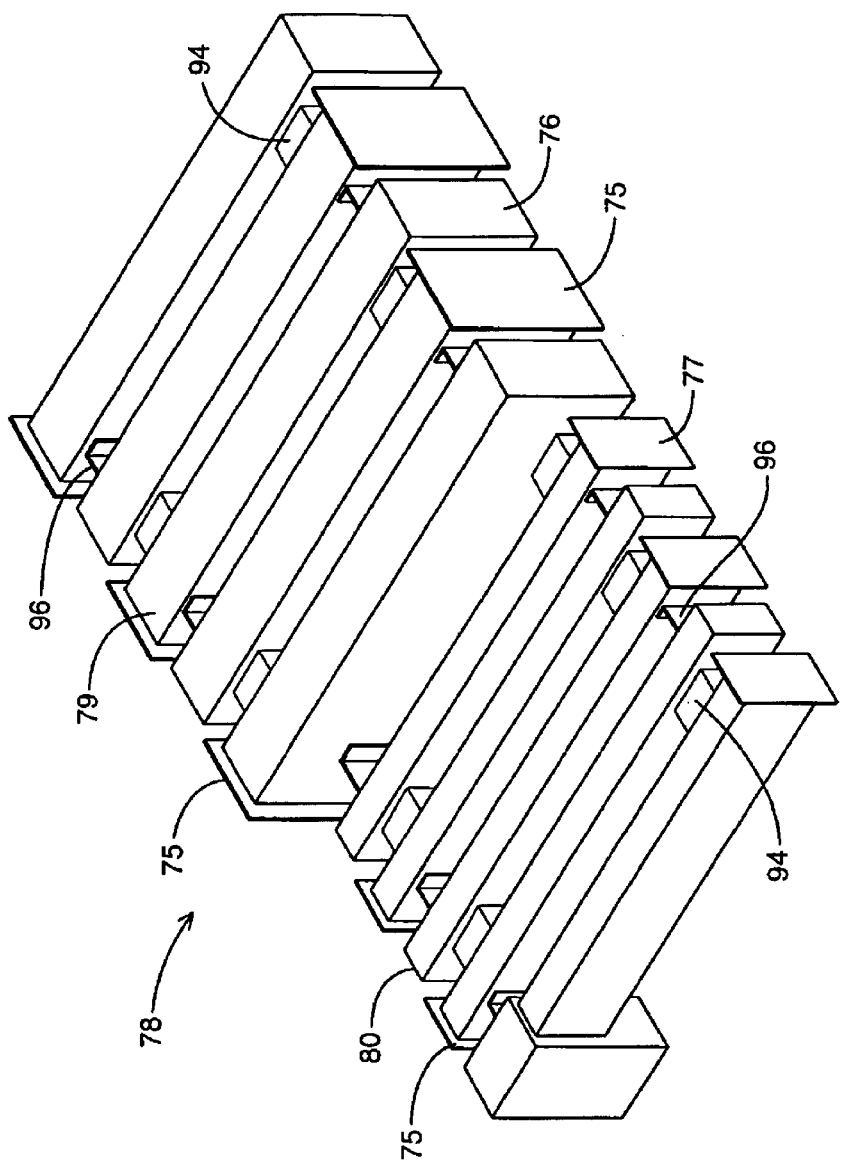

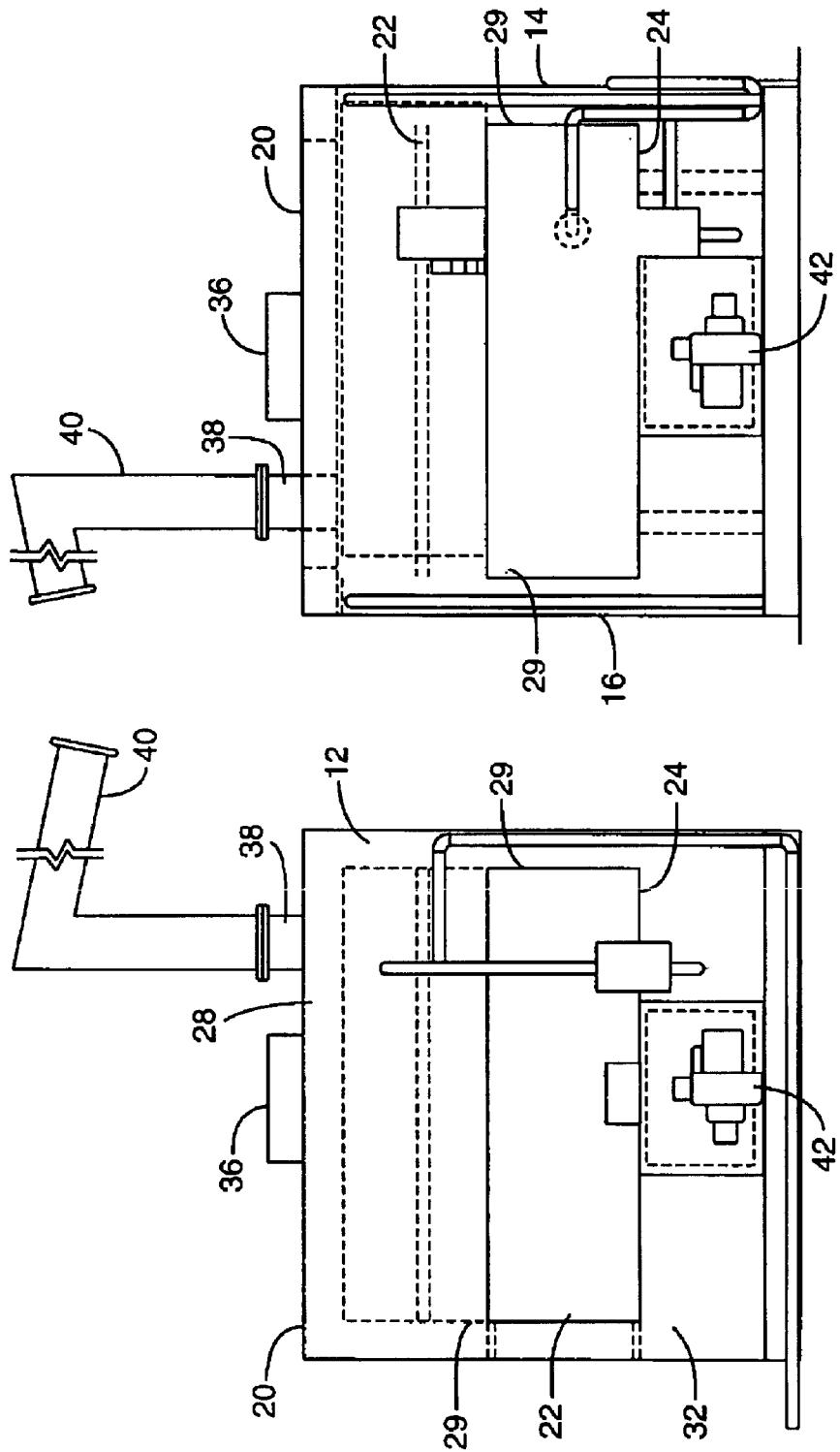

APPARATUS AND METHOD FOR RECLAIMING USEFUL OIL PRODUCTS FROM WASTE OIL INCLUDING HYDROGEN INJECTION

CROSS-REFERENCE TO RELATED APPLICATION

This application is a Continuation of the earlier application Ser. No. 08/956,480 filed Oct. 23, 1997, now abandoned, which is a Continuation-in-Part of the earlier application Ser. No. 08/829,526 filed Mar. 28, 1997, now U.S. Pat. No. 5,795,462, which is a File Wrapper Continuation application of Ser. No. 08/199,201 filed Jan. 21, 1994, now abandoned, which is a Continuation-in-Part of the earlier application Ser. No. 07/712,775 filed Jun. 10, 1991, now U.S. Pat. No. 5,286,349 which is a Continuation-in-Part of the earlier application Ser. No. 07/246,834 filed Sep. 20, 1988, now abandoned. The contents of all those earlier applications are hereby incorporated by reference.

FIELD OF THE INVENTION

This invention relates generally to an apparatus and a method for reclaiming waste oil, and more particularly relates to reclaiming waste oil from a sludge, i.e. a highly viscous material containing a relatively large amount of contaminants and particulate solids.

In this specification, the term "waste oil" encompasses any suitable oil, for example mineral oils which have been used as motor oil, or some other lubricating oil, or as hydraulic oil or in some other application. It is anticipated that these oils will have been derived from mineral oil, but they could be, for example, animal or vegetable oil, such as fish oil or oil discarded by restaurants, etc. The mineral oil could be plain crude oil. In use, such lubricating oils are usually changed periodically. The drained and recovered waste oil typically contain substantial amounts of contaminants, which may include dirt, metallic particles (including heavy metals, such and molybdenum, chromium, cadmium, vanadium, copper, etc.), oxides and salts, gasoline and gasoline additives (such as tetraethyl lead) as well detergents and performance additives. It may also be contaminated with water. Large quantities of such waste oil are produced in industrialized countries, and my earlier inventions were directed to methods and apparatus for recovering waste oil, so that it would be suitable for various uses. The contaminants in waste oil usually make it unsuitable for most uses. The term "waste oil" further includes an oil-based sludge such as that produced in the apparatus of my earlier invention described in application Ser. No. 246,834.

My earlier inventions provided an apparatus in which the lighter hydrocarbons of the waste oil were volatized and then condensed. Also, whilst the exact mechanism within the apparatus was not fully understood, it is believed that some cracking or splitting of the hydrocarbons from longer to shorter chain molecules occur. Indeed, it is even possible that the contaminants present acted as a catalyst. It was discovered that starting with contaminated, waste lubricating Oil, approximately 90% of this could be converted into a lighter oil, suitable for use as a diesel fuel.

My earlier inventions are disclosed in detail in U.S. Pat. No. 5,271,808, which discloses a basic refiner (secondary treater), and U.S. Pat. No. 5,286,349, which discloses a more advanced process and apparatus identified here as a preprocessor (primary treater). The contents of these two U.S. patents are hereby incorporated by reference.

The basic process of the refiner provided distillation with some cracking, carried out at substantially atmospheric pressure. This enabled the waste oil to be recovered as a diesel grade fuel oil, free of solid impurities and the like. This process left solids and other impurities concentrated as a sludge, which presented disposal problems. The later invention, the preprocessor, provided a process in which, when the solids and other impurities had built up to a certain level, further supply of waste oil is cut off, and the temperature raised to drive off all remaining organic and volatile components. This left a friable, cake-like material which has been classified as a "toxic non-leachate", which means that it can be disposed of readily in most jurisdictions.

However, a problem with the oil or diesel grade fuel recovered from either of my earlier inventions, is that it tended to be unstable. Practically, it is believed that the oil contained a number of free radicals and/or olefins. Consequently, over a period of time, these free radicals or olefins would combine, forming heavy oils and tars. Since the intention was to recover the oil as a diesel-grade fuel, this presented considerable problems. Such tar and heavy components tend to deposit in fuel injection systems and the like, clogging the systems and preventing proper operation.

Accordingly, it is desirable to provide an improvement or modification of my existing processes, which results in a recovered oil product which is stable, and which can be stored for a significant period of time, typically of the order of 30 days, without any serious or significant degradation or changes in characteristics, more particularly, without deposition of any tars or heavy hydrocarbons.

SUMMARY OF THE PRESENT INVENTION

In accordance with the present invention, there is provided a method of reclaiming a useful oil product from a waste oil, the method comprising the steps of:

(1) heating the waste oil to vaporize oil therefrom;
(2) injecting hydrogen gas into the vaporized oil, to cause saturation of at least some of olefins and free radicals present in the vaporized oil; and
(3) recovering the waste oil as a useful oil product.

The waste oil is vaporized at substantially atmospheric pressure, as this then eliminates the requirement to provide complex or costly pressure vessels or the like. Thus, steps (1) and (2) could be carried out at a pressure equivalent to up to 30 inches of water above atmospheric pressure.

More preferably, the temperature is sufficient to cause at least partial cracking of the oil. Advantageously, the recovered oil is condensed and recovered as a liquid.

Advantageously, the waste oil is heated in an evaporation chamber and oil is continuously supplied to the evaporation chamber, and the level of waste oil in the evaporation chamber is monitored, to maintain said level within desired limits.

In a preferred embodiment, the vaporized oil is passed through a connection duct from the evaporation chamber to a condensation and, for step (2) hydrogen is injected into the oil vapour in at least one of the evaporation chamber and the connection duct.

Advantageously, the hydrogen passes through a duct extending through liquid waste oil into the evaporation chamber, to preheat the hydrogen to the temperature within the evaporation chamber.

In accordance with my earlier preprocessor invention, the method can include an additional step (5): after a period of time, terminating supply of waste oil to the evaporation chamber and continuing to heat the evaporation chamber and waste oil therein in a bake mode to a substantially higher temperature, to vaporize substantially all residual waste oil in the evaporation chamber, to leave a solid residue within the evaporation chamber.

In accordance with another aspect of the present invention, there is provided a method of reclaiming a useful oil product from a waste oil the method being carried out substantially continuously and at substantially atmospheric pressure, and the method comprising the steps of:

(1) continuously supplying waste oil to an evaporation chamber;

(2) heating the waste oil in the evaporation chamber to generate oil vapours therefrom;

(3) injecting hydrogen gas into the oil vapours to cause saturation of at least some of olefins and free radicals present in the oil vapours; and (4) recovering and condensing the hydrogenated oil vapours as a useful oil product;

wherein all of the oil supplied in step (1) and all of the oil vapours generated in step (2) are recovered in step (4)

The method can be carried out in an apparatus for reclaiming a useful oil product from a waste oil, the apparatus comprising: an evaporation chamber, including an inlet for the waste oil, and an outlet for vaporized oil, as a useful oil product; a heating means for heating the evaporation chamber to vaporize oil from the waste oil; a means for injecting hydrogen into waste oil vapour; and a means for recovering the vaporized oil.

Preferably, the apparatus includes a condensation means and a connection duct connecting the outlet of the evaporation chamber to the condensation means. The means for injecting hydrogen advantageously comprises a conduit opening into at least one of an upper portion of the evaporation chamber and the connection duct. A part of the conduit can extend through a lower portion of the evaporation chamber, whereby hydrogen in the conduit is heated by the waste oil to the temperature within the evaporation chamber.

For continuous operation and in accordance with my earlier inventions, the evaporation chamber can include an inlet for waste oil, and the apparatus then includes a pump means for supplying waste oil to the evaporation chamber; and level control means for monitoring the level of waste oil within the evaporation chamber, the level control means being connected to the pump means and actuating the pump means to maintain waste oil level within desired limits. For operation as a preprocessor, the heating means is preferably connected to the level control means and, in a normal mode of operation, is disabled if the oil level goes outside the desired limits, and the apparatus further includes means for disabling the level control means and terminating the supply of waste oil, to enable continued operation of the heating means in a bake mode, in which the evaporation chamber is heated to an elevated temperature to vaporize remaining hydrocarbons.

BRIEF DESCRIPTION OF DRAWING FIGURES

For a better understanding of the present invention, and to show more clearly how it may be carried into effect, reference will now be made, by way of example, to the accompanying drawings which show a preferred embodiment of the apparatus and in which:

FIG. 2b is a perspective view of a layer of heat exchange ducts;

FIG. 4 is a right side view of the apparatus; and

FIG. 5 is a left side view of the apparatus.

DESCRIPTION OF THE PREFERRED EMBODIMENTS

Figure 1A:
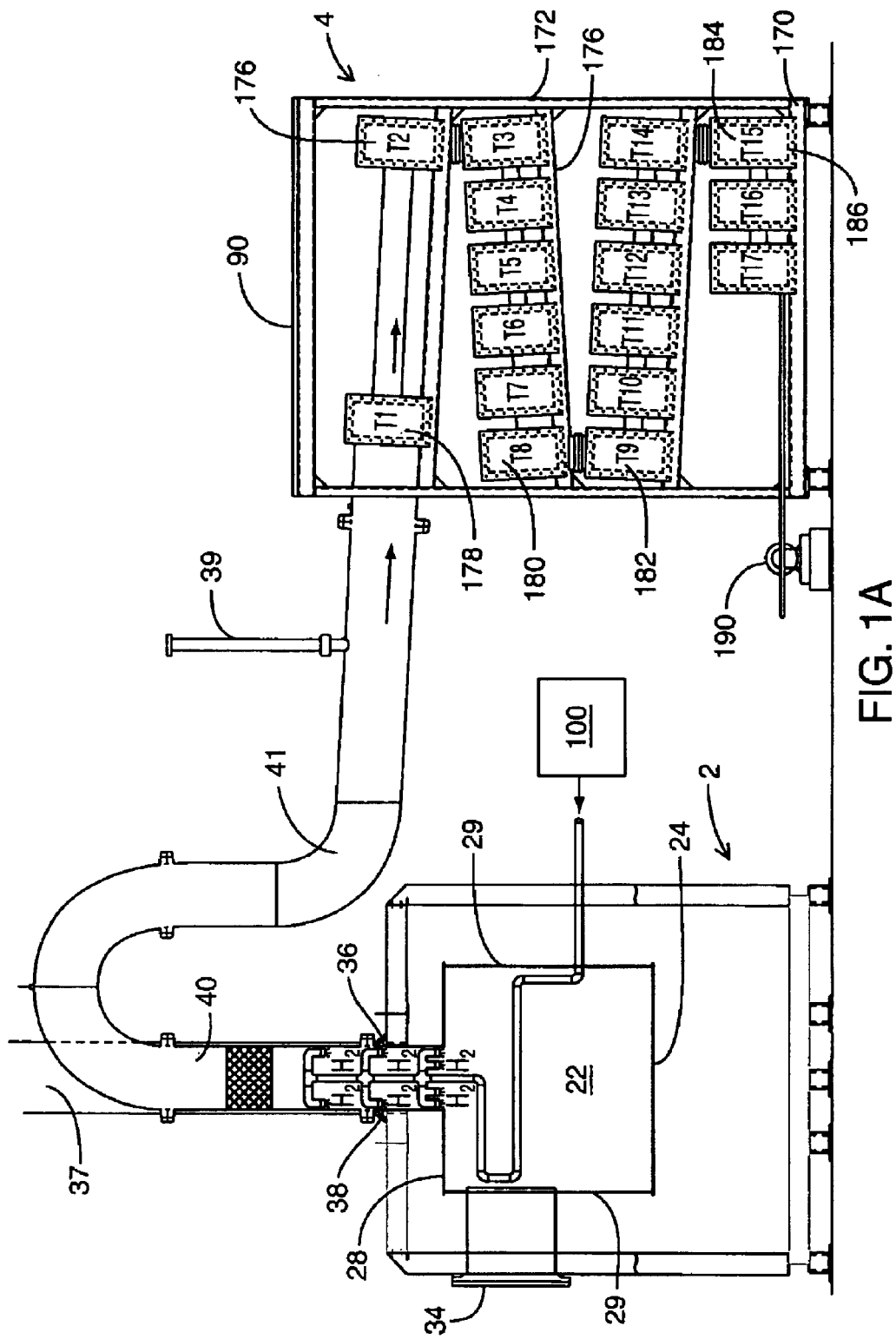
FIG. 1a is a side view of a preprocessor or primary treater in accordance with the present invention.
Figure 1B:
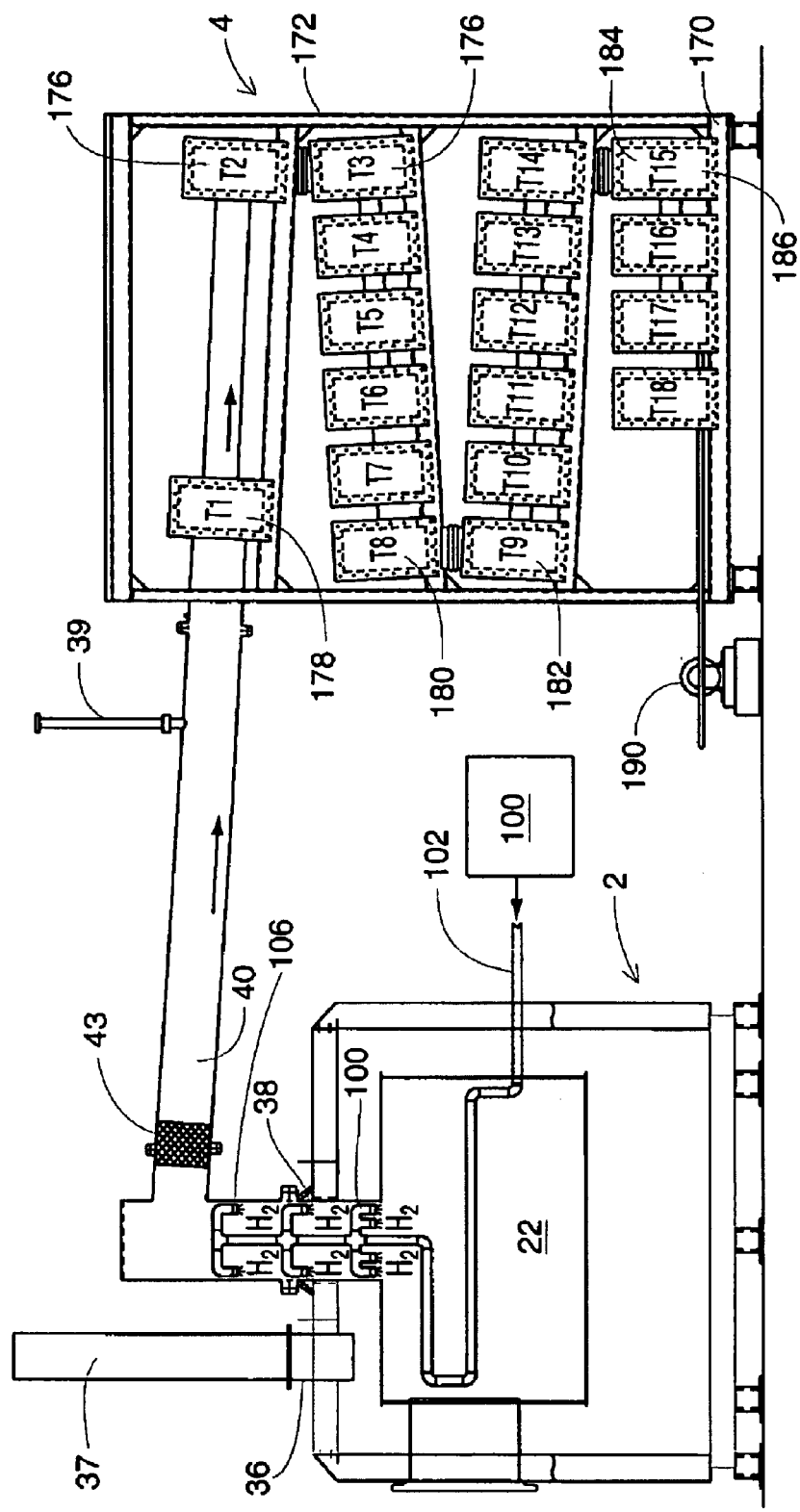
FIG. 1b is a side view of a refiner or secondary treater in accordance with the present invention.

FIG. 1a shows an apparatus in accordance with the present invention, generally indicated by the reference 1. The apparatus 1 includes two basic elements, namely an evaporation unit 2 and a condensing unit or heat exchanger 4, which are described in turn below. As details of this basic apparatus do not form part of the present invention, the structure of the apparatus 1a is only outlined here and full details are given in my earlier U.S. Pat. No. 5,286,349. The invention is here mainly described in relation to my preprocessor or primary treater. For completeness, FIG. 1b shows a refiner or secondary treater to show application of the present invention to such a device, and applicable reference numerals are indicated on FIG. 1b. Additionally, FIGS. 1a and 1b are based on current versions of the apparatus, while the other Figures are based on U.S. Pat. No. 5,286,349.

Figure 3:
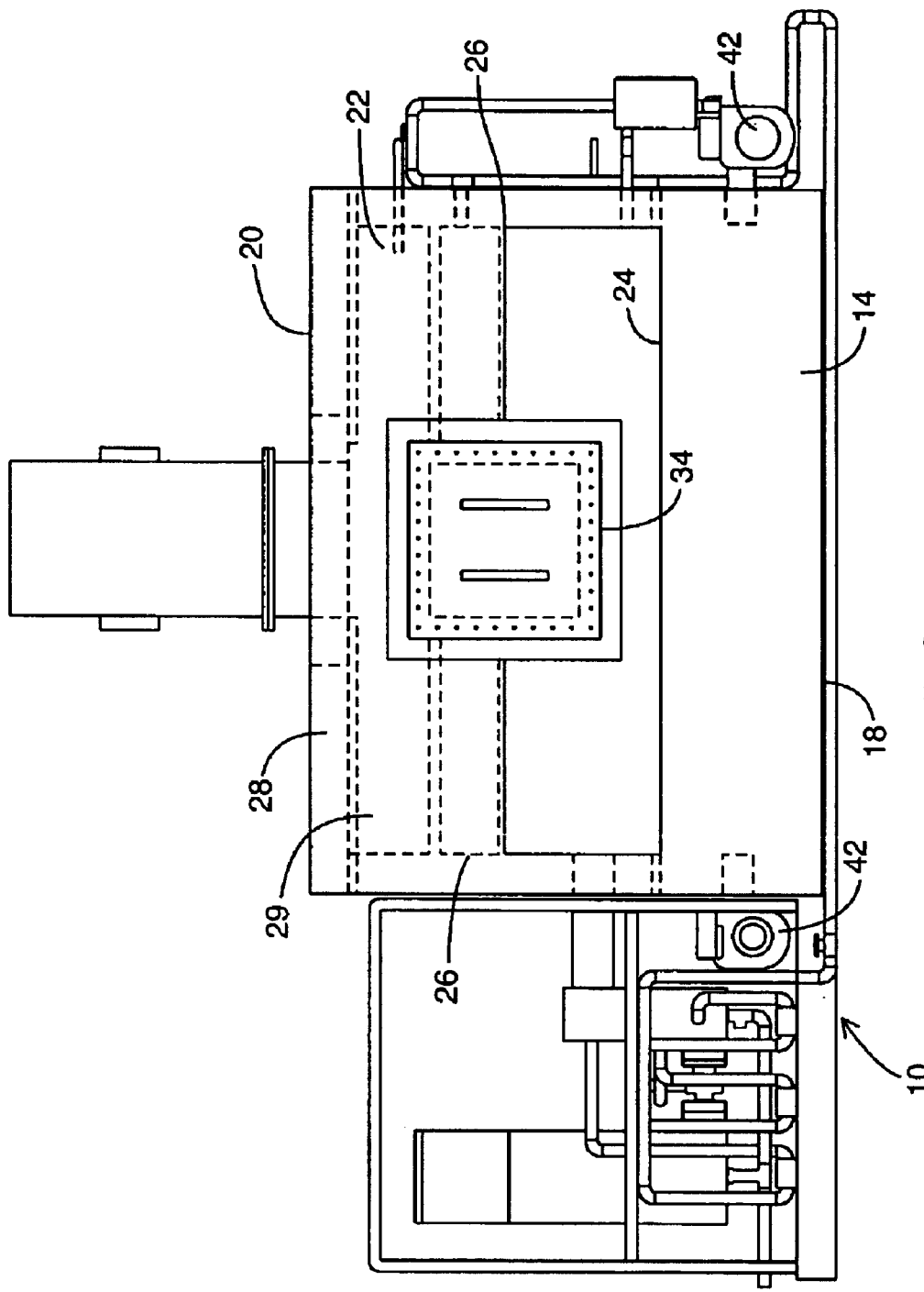
FIG. 3 is a front view of the apparatus.

As shown in FIG. 3, the evaporation unit 2 is of generally rectangular section and has a depth slightly less than its length or width. The evaporation unit 2 has two longitudinal support members 10 for supporting the unit, and facilitating transportation of the unit 2. The unit 2 has a housing 11 including external side walls 12, end walls 14, 16, a bottom wall 18 and a top wall 20. Within the unit 2, there is a waste oil distillation or evaporation chamber 22, which is spaced inwardly from all the outer walls of the unit 2. The chamber 22 is supported on a plurality of support cylinders (not shown), so as to enable free movement of hot gases around the waste oil chamber 22 and within the exterior walls 12–20. Each support cylinder is provided with a metal plate at either end, and the chamber 22 is freely mounted on the top plates, to allow for thermal expansion and contraction. The waste oil chamber 22 has a flat bottom 24. The chamber is made from 304L stainless steel. Extending up from this are side walls 26 which connect to a top wall 28. These walls 24, 26, 28 extend up to chamber end walls 29. In one end wall 29 there is a chamber access door 34, for an access opening extending through the respective end wall 14 to the chamber 22, to enable solid, cake-like material, left in the chamber 22, to be removed. Appropriate access doors can be provided for the combustion chamber. The chamber 22 also has, in known manner, longitudinal and transverse reinforcing or stay bars, to withstand the internal pressure of a full charge of waste oil.

In the top wall 20, there is an exhaust opening 36 which, is connected to a suitable exhaust stack 37. For the evaporation chamber 22, an outlet 38 is connected through to a connection duct 40. FIG. 1a shows a connection duct 40 that snows a distinct inverted U-shape, which continues through an elbow 41 to the condensing unit 4. As indicated at 39, a vent is provided which is connected to a pressure relief valve, in case any excess pressure condition arises. The system normally operates at a small positive pressure of around 0.5 p.s.i.g., i.e. an absolute pressure of 1.034 atmospheres, and the pressure relief valve is set to open at a pressure of 2.5 p.s.i.g, i.e. an absolute pressure of 1.170 atmospheres. As shown in FIG. 1, for the refiner, and in other figures for the preprocessor, the connection duct 40 can also comprise a generally straight vertical portion and then an inclined portion running down towards the condenser. In either case, the configuration should be such as to avoid dead spots, i.e. so as to ensure that any oil that condenses out of the duct 40 either runs back into the evaporation chamber for reboiling, or flows towards the condensation unit 4 for collection.

As indicated at 43, a reactive bed can be provided in a downcomer portion of the connection duct 40. This reactive bed 43 has been found not to be essential, and the hydrogenation of the oil occurs without it. The reactive bed 43 can comprise any suitable material that promotes reaction of the hydrogen with the oil vapour. It could comprise for example nickel-cadmium.

At either side of the evaporation unit 2, and mounted on each side wall 12, there is a blower 42 for a respective burner within the combustion chamber 32. Associated with each blower 42 is a fuel supply (not shown) for a suitable fuel. This could be fuel derived from the method of the present invention, or the method of my earlier application, or alternatively some entirely separate fuel source.

As shown in the front view of FIG. 3, the support members 10 extend on one side of the distillation unit 2 at a greater distance then they extend at the other side. This is to accommodate a waste oil supply system providing an inlet for the waste oil. The apparatus 1 includes means for supplying waste oil to the chamber 22 and for maintaining a desired level of oil in that chamber. Originally, this was provided by a float tank, with a series of floats and appropriate control circuitry connected to the floats. However, any suitable means can be provided for monitoring the oil level and for controlling operation of pumps, and associated equipment, and dependence on the detected oil level. Typically, this would include various failsafe devices, for example, interrupting operation of the burners if the oil level goes outside prescribed limits.

In accordance with the preprocessor aspects of my invention, the control circuitry also provides for disabling the safety switches which interrupt burner operation, if the oil level falls below a certain level. With these disabled, the burners are operated in a bake mode, to drive off all remaining hydrocarbons and volatile constituents of the material in the chamber, until just a solid cake-material is left. Burner operation is then terminated, and the chamber 22 allowed to cool, and the chamber then opened, to permit removal of the solid residue.

Another aspect of the evaporation unit detailed in my earlier patent is the provision of a baffle assembly, to promote flow of hard gases from the burners around the chamber 22, and to promote efficient heat transfer.

Turning to the condensation unit 4, this similarly has a pair of support members 70, for supporting the unit for and facilitating transportation thereof. It includes a framework 72 which supports an array of condensation or heat exchange pipes, generally indicated by the reference 74.

FIGS. 1a and 1b show a preferred and current form of the condensation unit. The other figures show an earlier version of the condensation unit, although the principles are the same for the two units.

In FIGS. 1a and 1b, condensation unit 4 has supporting members 170 and a framework 172, supporting transverse condensation pipes or ducts 174.

As for all embodiments, the structure of the condensation pipes 174 is deliberately kept simple, in order to provide a large transfer surface. This avoids the complexities of problems with more complicated configurations, including complex fin designs etc. Here, there are four layers of transverse ducts 176, labeled 178, 180, 182 and 184. The upper most layer of ducts 178 just has two ducts at either end. The next two layer of ducts 180, 182 each have six ducts, connected so that the flow of condensed oil flows backwards and forwards across the condensation unit 4. The lowermost layer of ducts 184 is essentially horizontal, and includes three transverse ducts.

As required, the ducts can be provided with end access doors, drain valves and the like. In particular, the fifteenth transverse duct 176 is indicated at 186, this being the first duct in the lowermost layer 184. This duct 186 is provided with a drainage valve, for enabling a sample of the condensed oil to be taken.

The outlet from the last duct in the series in connected to a final product pump 190, for delivering the condensed oil to a tank.

Figure 2A:
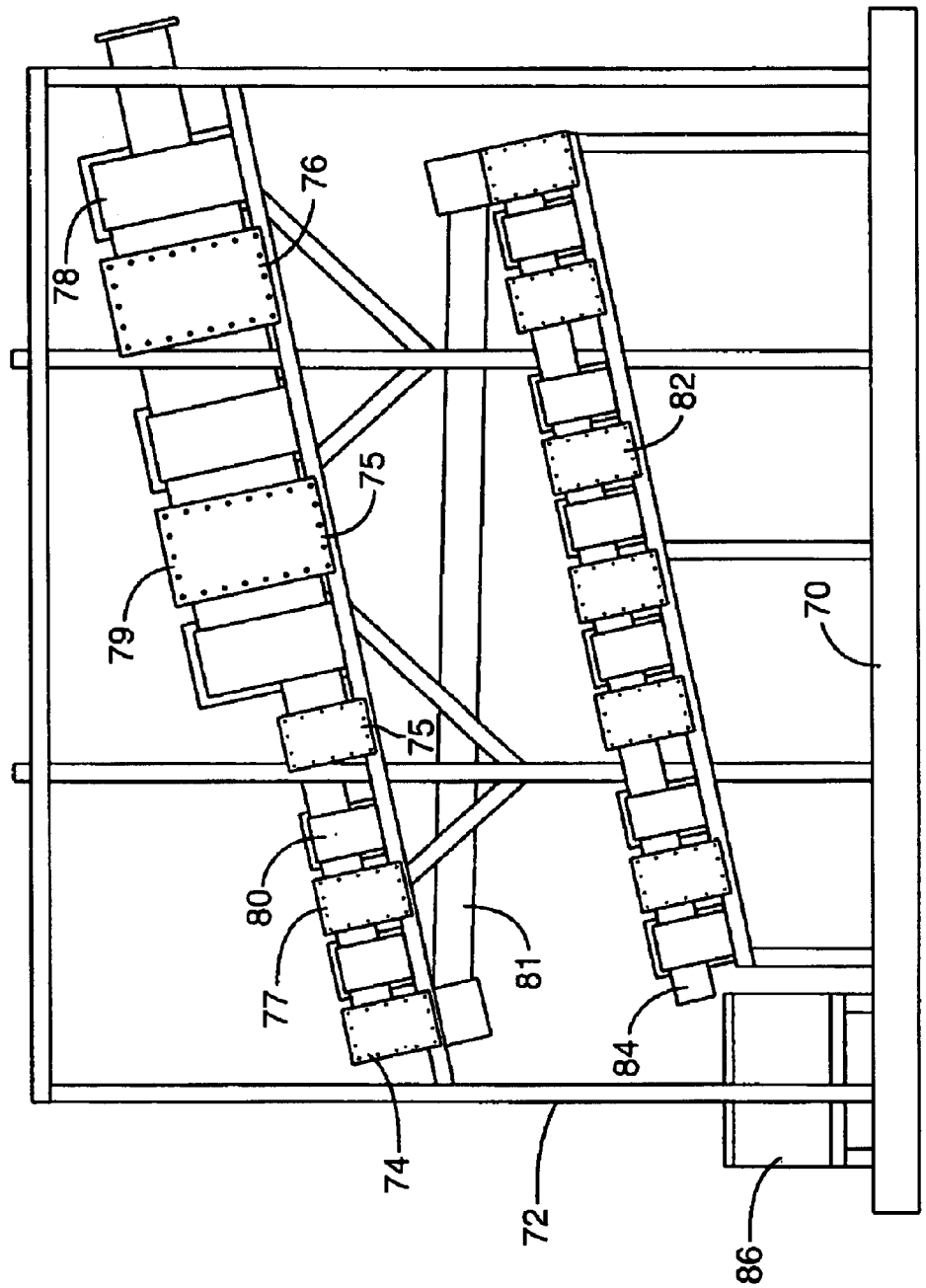
FIG. 2a is a side view on an enlarged scale, of the heat exchanger of the apparatus of FIG. 1.

FIGS. 2a and 2b show an alternative configuration for the condensation unit. Here, the structure of the condensation pipes 74 is deliberately kept simple, whilst providing a large heat transfer surface in order to avoid problems associated with complex designs, e.g. complex fin configurations. Thus, the condensation pipes comprise a plurality of transverse ducts 76 arranged in two inclined layers indicated at 78 and 82. The layers 78 and 82 are generally similar, although the size of the ducts varies between the layers. The first layer includes a first section 79 of larger ducts and a second section 80 of smaller ducts, similar to the second layer 82. The reason for this is that in the first section 79 there is a greater percentage of vapour present requiring a larger volume. Otherwise the arrangement in the various layers is generally similar and is described in relation to the top layer 78.

In the first section 79 of the top layer 78, there is the larger size ducts 76 and smaller ducts 77 in the second section 80. These ducts 76, 77 extend transversely, i.e. perpendicularly to the plane of FIG. 2. The ducts 76, 77 are each provided with one access plate 75 which are provided at alternate ends of the ducts. Only the access plates on one side are shown in FIG. 2a. Alternate ends of the ducts 76, 77 are connected through to one another, so as to give a meandering or zig zag path. In other words, vapour entering the uppermost duct 76 from the connection duct 40 will flow to one end of that duct, and then through to the next transverse duct 76. The vapour then travels along the length of that duct 76 before flowing down to the next transverse duct 76, and so on. A connection pipe 81 is provided between the layers of duct 78, 82. Consequently, the vapour flows in a zig zag or sinuous path through the ducts 76, 77 and the top layer 78 and then through the connection pipe 81 to the upper end of the layer 82 where the process is repeated, this layer comprising solely smaller ducts 77. The bottom layer 82 ends in an outlet 84 for recovered oil, which is collected in a collection tank 86. This tank is fitted with a float switch, for limiting the level of recovered oil in the tank 86, as detailed below.

While FIG. 2a shows heat exchange ducts that extend transversely, the configuration of FIGS. 1a and 1b is preferred. FIG. 2b shows an exemplary arrangement of large section ducts for the top section of such a heat exchanger. As before, the ducts 76 have access doors 75, which would be used for cleaning, to prevent buildup of a carbon deposit. Between adjacent pairs of ducts, there is a short connecting duct 94, and spacing brackets or reinforcements 96; these features would be present in all duct layers, but are only clearly shown in FIG. 2b.

The top layer 78 is enclosed within a housing 90 (FIG. 1). On top of the housing, there are six individual fans 92 arranged for drawing air from the ambient atmosphere and blowing it over the layers of ducts 78, 82. Thus it will be seen that the flow of cooling air, to effect condensation of the vapour is effectively in the same direction as the vapour flow.

In use, any water vapour present is condensed in the heat exchange ducts. Small drainage taps (not shown) are provided for this and corresponding drainage channels lead to a water collection tank (also not shown). If large quantities of water are generated, a removal pump can be provided, and the water can be treated in a water/oil separator. It is preferred to treat the waste oil in a pretreater to remove water vapour before processing. A pretreater simply heats the waste oil to a temperature above the boiling point of water, to drive off water vapour. A further alternative, where water is not separated in the condenser is to separate water from the recovered oil.

In use, the apparatus is operated for a certain period of time, with waste oil being continuously supplied to the evaporation chamber 22. Simultaneously, where the tank 86 is provided, this tank 86 is periodically emptied, as it fills up. This causes the amount or level of solids or contaminants in the evaporation chamber 22 to build up. During this time the temperature controller 128 is set to a desired temperature, for example in the range of 600° F. to 800° F. as taught in my earlier U.S. Pat. No. 5,271,808. Practically, it has been found that the apparatus will run at an almost constant temperature, depending on the feedstock, and the controller can be set to some margin above the actual operating temperature. It will be appreciated that, apart from the issue of dealing with the solids build-up which is described below, the whole process is essentially a continuous flow-through process without tanks or vessels requiring significant residence times.

After some time, the build up of solids in the chamber 22 will require the apparatus to be shut down. Means can be provided for monitoring the build up of solids, e.g. by providing for regular sampling and checking of the contents of the chamber 22. The exact level of solids that can be tolerated will depend upon the configuration of the chamber 22, and in particular, the means for supplying heat to it. The build up of solids acts as an insulator to inhibit heat transfer from the hot gases around the chamber 22 to the liquid within it. It is proposed to provide pipes running through the chamber 22 through which hot gases would pass. This would improve the heat transfer and permit a greater level of solids to build up within the chamber 22.

Once it is determined that the maximum allowable level of solids is present, then the supply of waste oil is turned off and a bake mode is started. At this time, the burners can continue operation. A low level switch is disabled, so that the waste oil level can be dropped to below that usually permitted. The fans will continue to operate, so long as a temperature sensor continues to sense a temperature in excess of that set.

When the heat exchanger 4 has cooled sufficiently, indicating that oil production has nearly ended, the temperature sensor and control circuitry will initiate the bake cycle. The temperature in the evaporation chamber 22 is then raised to a final, baking temperature to remove as much as possible of the volatile or liquid components in the evaporation chamber 22. This temperature is set by a temperature controller. The temperature controller could be initially set for a temperature of 900° F. For the final baking step, where the sludge supply is turned off, the temperature controller could be set for 1300° F.

The effect of this is to leave behind a solid, cake-like material which can readily be dug out from the evaporation chamber 22. This baking step is carried out until no further volatiles are being condensed and collected in the condensation unit 4, as determined by a bake timer.

When the apparatus is sufficiently cool, the access door 34 is opened, to enable the solid residue to be removed. The access door 30 will then be closed, and the process can be restarted with another batch of sludge.

In accordance with the present invention, there is provided a means for injecting hydrogen into the gases or vapours at the top of the evaporation chamber 22. This was achieved by providing a hydrogen source indicated schematically at 100 and a supply line 102 connected to the chamber 22. As shown a portion 104 of the supply line passes through the oil and/or vapour in the chamber 22, is of extended length, and opens near the top of the chamber 22. The supply line 104 is shown schematically, and would include a portion near the bottom of the chamber 22, which provides multiple passes through the liquid oil to ensure adequate heating of the hydrogen. This ensures that the hydrogen is preheated to the temperature in the chamber 22 before being injected into the vapour stream exiting from the chamber 22 and through the outlet 38 into the connection duct 40. An array of nozzles 106 is provided at three different levels, in a vertical portion of the outlet 38 and/or a vertical portion of the connection duct 40.

To test the efficiency of this hydrogen injection treatment, tests were run on a preprocessor, as shown in the accompanying drawings, and also on a refiner, as in FIG. 1b and in accordance with the invention disclosed in U.S. Pat. No. 5,271,808. Details of these tests are given below. In both cases, hydrogen was preheated, in the manner outlined above, by the hot oil in the evaporation chamber, and then added to vapours above the hot oil in the chamber.

The tests were carried out with a preprocessor and refiner which had been thoroughly clean to ensure the removal of tar deposits. For both units, samples collected during hydrogen addition were collected after the units had been operating for a sufficient time, approximately six hours, to reach a steady state condition. For samples collected with no hydrogen addition, the units of apparatus were operated for one to two hours after shutting off the hydrogen, before the liquid and gas samples were taken.

For the preprocessor shown here, the waste oil supplied was waste oil from a variety of industrial forces, primarily waste crankcase oil. For the refiner, the feedstock was oil that had been processed through the preprocessor shown and described here.

Samples of the liquid and gas product were collected for both units operating with and without hydrogen addition. Liquid samples were collected from the feed pump supplying oil to the preprocessor and from the product outlet. For the refiner, since the feed was the output from the preprocessor, just a liquid sample was taken from the product outlet. For the preprocessor, additionally a sample was collected from the draining valve on the condensation duct 186.

Additionally, in an attempt to obtain a sample representative of the total refiner product, including any volatiles that might be vented to atmosphere, a sampling system was used to collect samples from the transition or connection duct 40, connecting the evaporation chamber to the condenser in the preprocessor, and similarly for the refiner. The vapour sample taken from this location was passed through a water cooled condenser. Condensed liquids were collected in a glass jar. Any remaining gases were passed through a quartz wool plug and either vented or collected in a gas bag. For both units, the sample was collected from the connection duct and fed to a collection condenser. The line leading to the collection condenser was insulated, with the intention of preventing condensation of vapours until they reach the condenser of the sampling system.

For the preprocessor or primary treater, it was found that there was a flow of gas from the sampling system after the condensation of liquids. A sample of this gas was collected in a gas bag, both when operating with hydrogen and without hydrogen. This gas bag was shipped to a research facility for analysis. On the refiner or secondary treater, there was no pressure in the transition duct, so that no gas sample could be collected. Table 1 summarizes the operating conditions of the preprocessor and refiner during sampling and testing.

During these tests, for the preprocessor, 80 l/min of hydrogen were added near the exit of the evaporation chamber 22. Assuming a product flow of 290 gal/hr (comparable with a figure of 285 in Table 1) from the exit of the evaporation chamber 22 and a boiling point distribution between 70° to 400° C., hydrogen will be present at an estimated concentration of 3.2% by volume in the vapour and the exit from the chamber 22. If all of the hydrogen reacted to the product oil, hydrogen addition to the oil would be about 0.04% by weight.

During the test with the hydrogen addition, the gas temperature in the outlet 38 from the evaporation chamber 22 was 30° C. higher than the oil temperature in the chamber 22, whereas without <1 hydrogen addition, the gas temperature was 2° C. lower than the oil temperature. This is to be expected as hydrogenation is an exothermic reaction. Typical heats of reaction for hydrogenation of olefins either range from −133 kJ/gmole to −125 kJ/gmole of hydrogen reacted. Using the above flow rates and assuming that all of the hydrogen reacted with olefins, the temperature of the gas exiting the preprocessor would be expected to increase by 8° C. A higher temperature rise would occur if some of the hydrogen was reacting With oxygen containing compounds to form water, giving a greater heat of reaction. The increased exit gas temperature shown in Table 1 indicates hydrogenation was occurring. Bearing in mind the large number of reactions that could be occurring, the temperature rise of 13° C. is consistent with a calculated rise of 8° C. if all of the hydrogen reacted with all of the compounds. As noted, gas samples were collected in gas bags from the connection duct 40 for the preprocessor, one when hydrogen was being added and one without. Samples were collected in gas bags after condensing liquids from the vapours. For these tests, it was necessary to ship the gas, in bags, to a separate test facility. Ideally, for an accurate gas analysis, a gas chromatograph should be connected directly to the apparatus, but this was not possible. Additionally, such collected gas should be analyzed immediately, which again was not possible here. Gas analysis is shown in Table 2. These samples appear to indicate contamination there, as indicated by the high $O_2$ and $N_2$ content, and for this reason should be viewed with caution. Table 2 gives the concentrations as analyzed and after normalizing for air and missing components (e.g. light volatiles or gas that were flared off). Even then, these analyses may not be completely accurate; but, some general observations can be made from the normalized concentrations. The hydrogen concentration was three times higher in the gas phase when hydrogen was added at 80 l/min. There are also a number of gas composition differences, strongly indicative that hydrogen was reacting with products from the evaporation chamber, namely: the CO to $CO_2$ ratio dropped from about 4:1 without hydrogen to about 1:4 with hydrogen; methane concentration dropped dramatically from over 50% to under 4%; ethane to ethene ratio was 1:1 without hydrogen and about 6:1 with hydrogen; $H_2S$ or other sulfur-containing compounds were not detected in the gas analysis either with or without hydrogen.

Table 3 lists samples collected along with comments on the physical appearance of the samples. There was insufficient pressure on the refiner model 320 to extract a liquid sample from the connection duct. One 150 mL sample was collected during the run with hydrogen addition by applying a slight vacuum to the sample. Table 3 additionally includes visual notes on the liquid samples collected immediately after sampling. As for other samples taken, sample containers were purged with nitrogen and kept from exposure to the light. As the samples were sent to a remote location for examination, they were received possibly seven days after the samples were taken, and during that time, no noticeable change in the physical appearance was noted.

Table 4 lists the analytical results for liquid samples collected from the primary treater or preprocessor model 510, while Table 5 lists the corresponding analytical results for samples collected from the secondary treater or refiner model 320.

These analyses revealed that sample numbers 3 and 5, collected from one of the condensation ducts on the condensation unit 4 were primarily water, containing a small amount of hydrocarbons. For the refiner model 320, significant differences with and without hydrogen were not large.

For the preprocessor, comparison of sample numbers 1, 2, 4, 6 and 7 show the effect of hydrogen addition. The product oil sample from the processor with hydrogen addition was a lighter liquid than the sample collected without the hydrogen addition. This is consistent with the lower density measured in the product with hydrogen addition.

Olefins can be unstable compounds that result in the formation of tars in petroleum products. The bromine number analytical technique, performed in accordance with ASTN D 1159, measures the amount of bromine in grams reacted per 100 grams of oil sample. Bromine will react with double bounded carbon, except aromatics, in the hydrocarbon liquid and gives a measure of the amount of olefins in the sample. Changes in bromine number greater than + or −1 are significant.

Here, the samples withdrawn from the connection duct 40 on the preprocessor model 510 show the largest different in bromine number, as between samples with and without hydrogen addition. The bromine number increased from 12.3 to 20.5 when hydrogen flow was stopped. The bromine number of the product oil also increased slightly without hydrogen addition, from 5.4 to 7.3. The reduction of the bromine number when hydrogen is used indicates that olefins are being saturated by hydrogen addition.

Here, it can be noted that both the preprocessor and refiner tested holds significant volumes of product oil in their condensers. As such, the unit may not have been operated long enough without hydrogen flow to purge all of the product oil from the condensers and to reach a steady state without hydrogen. A longer period of operation without hydrogen gas flow would be necessary to ensure that the product oil sample taken from the condensation of the unit in case was truly representative. Note that liquid samples taken from the connection duct between the evaporation chamber and the condensation unit, which show a significant change in the Bromine number, likely better reflect the effect of hydrogen addition, since they were not affected by the relatively large liquid volumes of the condensation units. This product oil hold up may explain way the bromine number differences. The Bromine number change for the product oil samples was not as large as for the transition duct samples.

Oil density differences were not large with or without hydrogen flow. The feed oil density of 0.9 was reduced to 0.85 in the preprocessing model 510 and to 0.83 after further treatment in the refiner model 320. The lower density of 0.82 to 0.83 in samples numbers 4 and 7 collected from the connection duct 40 suggests that the sampling procedure did not effectively recover the heavier liquid products. The higher boiling components would likely condense in the connection duct. The lower density of the liquid samples for the preprocessor model 510 when hydrogen was added is consistent with the transformation of olefins to paraffins, which have a lower density.

As to the filtered solid contents of the samples in Tables 4 and 5, apart from the feed which, as is known, has a relatively high solids content, the different concentrations were low and not significant.

Concerning elemental analysis, there are no large differences in the elemental composition with or without hydrogen in the samples collected from the preprocessor model 510 unit. The sulphur and oxygen content were reduced slightly in both the connection duct 40 and the product oil samples with hydrogen addition. The oxygen content of the samples was not measured directly but was determined by difference from the analyzed C, H, N and S analyses. The increase of H/C ratio for the preprocessor liquids when hydrogen was added is again consistent with hydrogen addition to the liquids. There was little significant difference in the elemental analysis product oils collected from the refiner model 320, with or without hydrogen addition.

Table 6 gives a simulated distillation of the feed products, and indicates the boiling point distribution. Thus, IBP indicates initial boiling point and FBP indicates final boiling point, and the numbers 10, 20 etc. indicate the boiling point after 10%, 20% etc. of the initial sample had been evaporated.

The product oil collected from the refiner model 320 had a lower boiling point than the feed oil, as shown in Table 6. There was little or no difference in boiling point distribution for the product collected from the refiner 320 with or without hydrogen addition. For the preprocessor model 510, the initial boiling point temperatures for the lower fractions were much reduced, although the final boiling point was slightly higher.

The control system for supplying hydrogen preferably includes a number of safety features. These can include: location of hydrogen tanks outside of a main building housing the refiner or preprocessor as the case may be; hydrogen supply shut off valve located at the hydrogen supply tanks, which can be remotely operated from a controller; check valves in the hydrogen supply line to prevent back flow of oil into the hydrogen supply line; integration with a refiner or preprocessor control system, to include automatic shut off of the hydrogen during start up, shut down and interrupt or upset conditions, so as to minimize introduction of hydrogen when hydrocarbon vapours are not present; adequate ventilation of buildings and insulation, to ensure dissipation of any vented hydrogen, and hydrogen detectors provided at the highest point in a building.

The data collected during experiments on the preprocessor model 510 indicates that hydrogen gas injected into the evaporation chamber 22 was reacting with the product vapours. Hydrogen addition had the following measured effects:

(1) increase in gas temperature in the connection duct 40;
(2) reduced olefin content in oil samples collected from the connection duct 40;
(3) reduced density and boiling point distribution of the final oil product;
(4) slight reduction in sulphur content and perhaps oxygen content in the product oil;
(5) reduced ethylene and increased ethane concentration in the product gas.

TABLE 1

|  | Preprocessor Model 510 no $H_2$ | Preprocessor Model 510 with $H_2$ | Refiner Model 320 no $H_2$ | Refiner Model 320 with $H_2$ |
|---|---|---|---|---|
| FLOWS | | | | |
| feed oil | 250 gal/hr | 400 gal/hr[1] | | 290 gal/hr |
| sludge | 40 gal/hr | 70 gal/hr[1] | | 32 gal/hr |
| product | 200 gal/hr | 285 gal/hr[1] | | 250 gal/hr |
| oil level (evaporation chamber 22) | 20 in. | 25.5 in. | | 20 in. |
| TEMPERATURES | | | | |
| bottom (evaporation chamber 22) | 687° C.[3] | N/A | | 307° C.[2] |
| oil in evaporation chamber 22 | 387° C. | 360° C. | | 265° C. |
| outlet 38 | 385° C. | 373° C. | N/A | N/A |
| connection duct 40 | 207° C. | 294° C. | | N/A |
| inlet condensation unit 4 | 207° C. | 393° C. | | 207° C. |
| outlet condensation unit 4 | 27° C. | 23° C. | | 31° C. |

TABLE 1-continued

|  | Preprocessor Model 510 no $H_2$ | Preprocessor Model 510 with $H_2$ | Refiner Model 320 no $H_2$ | Refiner Model 320 with $H_2$ |
|---|---|---|---|---|
| PRESSURES | | | | |
| evaporation chamber 22 | 11 in. $H_2O$ 1.027 atm | 16 in. $H_2O$ 1.039 atm | | 0 1 atm |
| condensation unit 4 | 9 in. $H_2O$ 1.022 atm | 13 in. $H_2O$ 1.032 atm | | 0 1 atm |

[1] The difference between these figures is due to varying oil level in chamber 22.
[2] This temperature is much lower than that for the Preprocessor as a much lighter oil is being processed.
[3] Note this is for normal, continuous operation and not the bake mode.

TABLE 2

|  | Composition (Vol %) | | Normalized Composition (Vol %) | |
|---|---|---|---|---|
| Component | no $H_2$ | with $H_2$ | no $H_2$ | with $H_2$ |
| $H_2$ | 2.77 | 5.26 | 29.46 | 90.34 |
| $CO_2$ | 0.11 | 0.16 | 1.20 | 3.84 |
| CO | 0.47 | 0.04 | 5.03 | 0.91 |
| $CH_4$ | 5.00 | 0.15 | 53.13 | 3.56 |
| $C_2H_4$ | 0.51 | 0.01 | 5.45 | 0.26 |
| $C_2H_6$ | 0.47 | 0.08 | 5.00 | 1.80 |
| other HC'S | 0.07 | 0.12 | 0.72 | 2.81 |
| $O_2$ | 11.82 | 19.03 | | |
| $N_2$ | 67.89 | 76.70 | | |
| missing | 10.89 | −1.56 | | |

TABLE 3

| Sample No. | Unit | Time | $H_2$ | Sample Location | Comments |
|---|---|---|---|---|---|
| 1 | raw feed | | | feed tank | dark brown/black |
| 2 | 510 | 21:47 | y | product pump | colour of clean used engine oil |
| 3 | 510 (preprocessor) | 22:00 | y | condenser duct 186 | yellow, colour of beer, clear with fine suspended sediment, no tar on walls of jar, fine powdery settled sediment |
| 4 | 510 | 10:30–10:45 | y | total sample drawn from connection duct 40 | colour of engine oil, some water separated out overnight, sediment, some tar stuck to jar |
| 5 | 510 | 24:15 | n | condenser duct 186 | colour of dark beer, noticeable tar globules and tar stuck to jar, larger amount of tar than sample 3 |
| 6 | 510 | 24:23 | n | product pump 190 | colour of clean used engine oil, fine black sediment on bottom |
| 7 | 510 | 24:23–24:38 | n | total sample drawn from connection duct 40 | light yellow, colour of new engine oil, some water and tar settled overnight, similar in appearance to sample 4 |
| 8 | 320 (refiner) | 01:47 | y | product pump 190 | clear, light yellow green colour, fine black sediment |
| 9 | 320 | 03:30 | n | middle condenser duct | cloudier with tar deposits when compared to sample B |
| 10 | 320 | 02:23 | y | total sample drawn from connection duct 40 | light clear liquid with tar globules and tar stuck to jar walls |

[For sample #9, the sample was taken from around the fourth or fifth condenser duct, as counted from the top of the condensing unit 4.]

TABLE 4

ANALYTICAL RESULTS FOR LIQUID SAMPLES COLLECTED FROM THE PRIMARY TREATER (MODEL 510)

| Sample | No. | Bromine No. (g/100 g) | Density (g/cm³) | Solids Content (wt %) | Elemental Analysis (wt %) | | | | |
|---|---|---|---|---|---|---|---|---|---|
| | | | | | C | H | N | S | O* |
| Feed Connection Duct 40 | 1 | 10 | 0.9068 | 1.41 | 85.19 | 12.20 | 0.27 | 1.29 | 1.05 |
| No H₂ | 7 | 20.5 | 0.8215 | 0.007 | 85.27 | 13.18 | 0.037 | 0.68 | 0.83 |
| With H₂ Product | 4 | 12.3 | 0.8360 | 0.026 | 85.86 | 13.03 | 0.036 | 0.56 | 0.51 |
| No H₂ | 6 | 7.3 | 0.8628 | 0.042 | 86.15 | 12.80 | 0.041 | 0.59 | 0.42 |
| With H₂ Condenser #15 (mainly water) | 2 | 5.4 | 0.8524 | 0.025 | 86.30 | 13.01 | 0.029 | 0.48 | 0.18 |
| No H₂ | 5 | 0.3 | 1.0309 | 0.17 | 1.90 | 10.83 | 0.322 | 0.16 | 86.79 |
| With H₂ | 3 | 0.37 | 1.0097 | 0.036 | 0.74 | 11.1 | 0.182 | 0.08 | 87.90 |

*oxygen content determined by difference

TABLE 5

ANALYTICAL RESULTS FOR LIQUID SAMPLES COLLECTED FROM THE SECONDARY TREATER (MODEL 320)

| Sample | No. | Bromine No. (g/100 g) | Density (g/cm³) | Solids Content (wt %) | Elemental Analysis (wt %) | | | | |
|---|---|---|---|---|---|---|---|---|---|
| | | | | | C | H | N | S | O* |
| Feed Connection Duct 40 | 2 | 5.4 | 0.8524 | 0.025 | 86.30 | 13.01 | 0.029 | 0.48 | 0.18 |
| No H₂ | N/A | — | — | — | | | | | |
| With H₂ Product | 10 | 6.5 | 0.8286 | 0.008 | 86.19 | 13.35 | 0.019 | 0.22 | 0.22 |
| No H₂ | 9 | 5.2 | 0.8307 | 0.003 | 85.78 | 13.23 | 0.019 | 0.23 | 0.74 |
| With H₂ | 8 | 8.6 | 0.8335 | 0.003 | 85.97 | 13.19 | 0.025 | 0.22 | 0.59 |

*oxygen content determined by difference

TABLE 6

| | Sample # | Distillation Results | | | | | | | | | | |
|---|---|---|---|---|---|---|---|---|---|---|---|---|
| | | IBP | 10 | 20 | 30 | 40 | 50 | 60 | 70 | 80 | 90 | FBP |
| Feed Waste Oil | 1 | 100 | 212 | 258 | 306 | 358 | 412 | 466 | 539 | — | — | >615 |
| Model 510 (preprocessor) | | | | | | | | | | | | |
| No H₂ | 6 | 90 | 181 | 220 | 249 | 275 | 302 | 326 | 352 | 380 | 414 | 511 |
| With H₂ | 2 | <36 | 41 | 72 | 178 | 234 | 265 | 294 | 319 | 350 | 389 | 514 |
| Model 320 (refiner) | | | | | | | | | | | | |
| No H₂ | 9 | 87 | 159 | 183 | 203 | 220 | 236 | 250 | 266 | 285 | 310 | 395 |
| With H₂ | 8 | 87 | 164 | 189 | 207 | 222 | 236 | 250 | 264 | 281 | 307 | 397 |

I claim:

1. A method of reclaiming a useful oil product from a waste oil, the method comprising the steps of:

(1) providing a stream of waste oil;

(2) heating the waste oil to vaporize oil therefrom;

(3) passing a supply line containing hydrogen through the heated waste oil to heat the hydrogen;

(4) injecting the heated hydrogen into the vaporized oil; and (5) recovering the vaporized oil as a useful oil product.

2. The method of claim 1, wherein the step of heating includes vaporizing the waste oil at a temperature sufficient to cause at least partial cracking of the waste oil.

3. The method of claim 2, further comprising, after the step of recovering, condensing the vaporized oil.

4. The method of claim 2, wherein the step of heating includes
   heating the waste oil in an evaporation chamber;
   continuously supplying waste oil to the evaporation chamber; and
   monitoring the level of waste oil in the evaporation chamber to maintain said level within set limits.

5. The method of claim 4, wherein the step of recovering includes
   passing the vaporized oil through a connection duct from the evaporation chamber to a condensation unit; and
   condensing the oil vapour in the condensation unit, wherein the step of injecting occurs in at least one of the evaporation chamber and the connection duct.

6. The method of claim 5, wherein the step of passing includes passing the hydrogen through a duct extending through liquid waste oil in the evaporation chamber, to preheat the hydrogen to the temperature within the evaporation chamber.

7. The method of claim 5, which additionally includes providing a catalyst-containing reactive bed in the connection duct, and passing the hydrogen gas and vaporized oil through the catalyst to promote hydrogenation of at least some of olefins and free radicals.

8. The method of claim 6, which additionally includes providing a catalyst-containing reactive bed in the connection duct, and passing the hydrogen gas and vaporized oil through the catalyst to promote hydrogenation of at least some of olefins and free radicals.

9. The method of claim 4, further comprising
   after a period of time, terminating supply of waste oil to the evaporation chamber; and
   continuing to heat the evaporation chamber and waste oil therein in a bake mode to a substantially higher temperature to vaporize substantially all residual waste oil in the evaporation chamber to leave a solid residue within the evaporation chamber.

10. The method of claim 9, further comprising
    after all of the waste oil has been vaporized from the evaporation chamber, permitting the evaporation chamber to cool, opening the evaporation chamber and removing the solid residue.

11. The method of claim 9, wherein, in the step of continuing to heat, a temperature of up to 1300° F. is reached during the bake mode, sufficient to volatize any remaining hydrocarbons.

12. The method of claim 1, wherein, in the step of heating, the oil is heated to a temperature in the range of 600–800° F.

13. A method of reclaiming a useful oil product from a waste oil, the method being carried out substantially at atmospheric pressure, the method comprising
    (1) continuously supplying waste oil to an evaporation chamber;
    (2) heating the waste oil in the evaporation chamber to generate oil vapors therefrom;
    (3) passing a supply line containing hydrogen through the heated waste oil to heat the hydrogen;
    (4) injecting the heated hydrogen into the vaporized oil; and
    (5) recovering the oil vapors as a useful oil product.

14. The method of claim 13, wherein the method is carried out in an apparatus which is one of: open to the atmosphere to maintain a substantially atmospheric pressure; and is provided with a pressure release valve limiting pressure within the apparatus to a pressure not substantially different from atmospheric pressure.

15. The method of claim 13, further comprising, after the step of injecting, passing the oil vapours and the hydrogen gas through a reactive bed to promote hydrogenation of the oil vapours.

16. The method of claim 13, wherein all of the oil vapours generated in step (2) are subjected to all of the steps of the method, without separation and recirculation of any component of the waste oil.

17. The method of claim 16, wherein the method is carried out at a temperature sufficient to cause at least partial cracking of the waste oil, whereby the recovered oil is a lighter, lower viscosity oil.

18. A method of reclaiming a useful oil product from a waste oil, the method comprising the steps of:
    (a) providing a stream of waste oil;
    (b) heating the waste oil to vaporize oil vapor therefrom;
    (c) passing a supply line containing hydrogen through the heated waste oil to heat the hydrogen;
    (d) injecting the heated hydrogen into the vaporized oil; and
    (e) recovering the vaporized oil as a useful oil product;
    wherein the method is carried out at substantially atmospheric pressure.

19. The method of claim 18, wherein the vapor is generated in step (b) and all of the oil vapor is continuously subjected to steps (d) and (e).

20. The method of claim 18, wherein, in the step of injecting, the heated hydrogen is injected into the vaporized oil in the presence of a catalyst.

21. The method of claim 20, wherein the catalyst includes at least one of nickel and cadmium.

* * * * *